April 24, 1928.

R. S. SANFORD

BRAKE

Filed Nov. 2, 1925

INVENTOR
Roy S. Sanford
BY
J. W. McConkey
ATTORNEY

April 24, 1928.  R. S. SANFORD  1,667,395
BRAKE
Filed Nov. 2, 1925  2 Sheets-Sheet 2
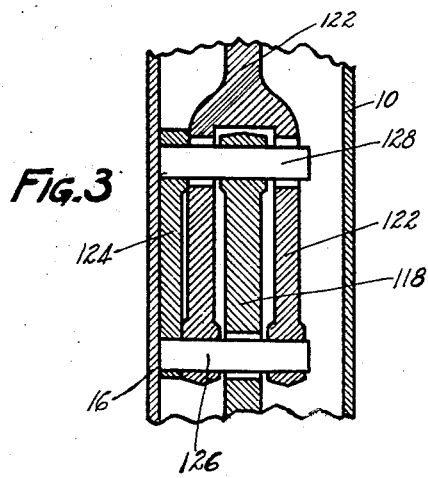
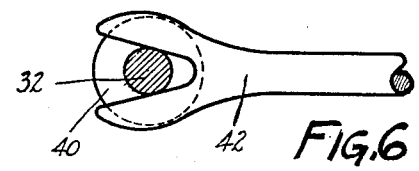
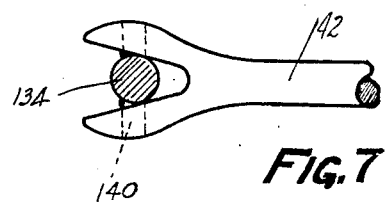
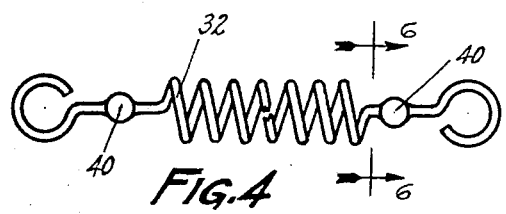
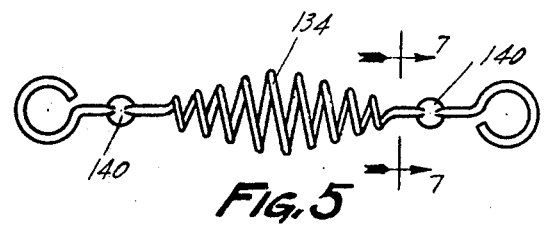
INVENTOR
ROY S. SANFORD
BY
M. W. McConkey
ATTORNEY Patented Apr. 24, 1928.

1,667,395

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed November 2, 1925. Serial No. 66,272.

This invention relates to brakes, and is illustrated as embodied in internal expanding automobile brakes. An object is to arrange the parts of a brake of the type in which a servo shoe forces another shoe against the drum, in such a manner as to secure extremely smooth and progressive operation, without requiring too great accuracy in manufacture.

Having this object in view, I prefer to connect the shoes (which in one modification are shown overlapping at their ends) by a rigid connecting member or link which can float freely to adjust itself to the positions of the shoes. A spring is provided for urging the connected ends of the shoes away from the drum, to insure engagement with the drum first by the servo shoe, which then turns with the drum to overcome the spring and apply the other shoe.

In the drawings the spring is shown connected to the rigid link, holding the shoes against stationary stops. An important minor feature of novelty relates to arranging one stop as a fulcrum about which the servo shoe swings when applied, so that the unconnected end of the shoe first turns with the drum to force the connected end outward, partly overcoming the spring, and the entire servo shoe then turns with the drum to force the other shoe against the drum, thus securing very smooth and gradual application of the brake.

Other features of novelty relate to forming a shoulder on the brake spring, for a tool taking the tension of the spring while it is being attached or detached and to various other novel and desirable particular constructions which will be apparent from the following description of the illustrative embodiments shown in the accompanying drawings, in which:

Fig. 3 is a section on the line 3—3 of Fig. 2, showing the linkage connecting the shoes;

Fig. 4 is an elevation of one of the springs, on a larger scale;

Fig. 5 is a similar view of another of the springs;

Fig. 6 is a section through one spring on the line 6—6 of Fig. 4, but showing also a partial side elevation of a tension-taking tool in place; and Fig. 7 is a similar view on the line 7—7 of Fig. 5.

Figure 1:
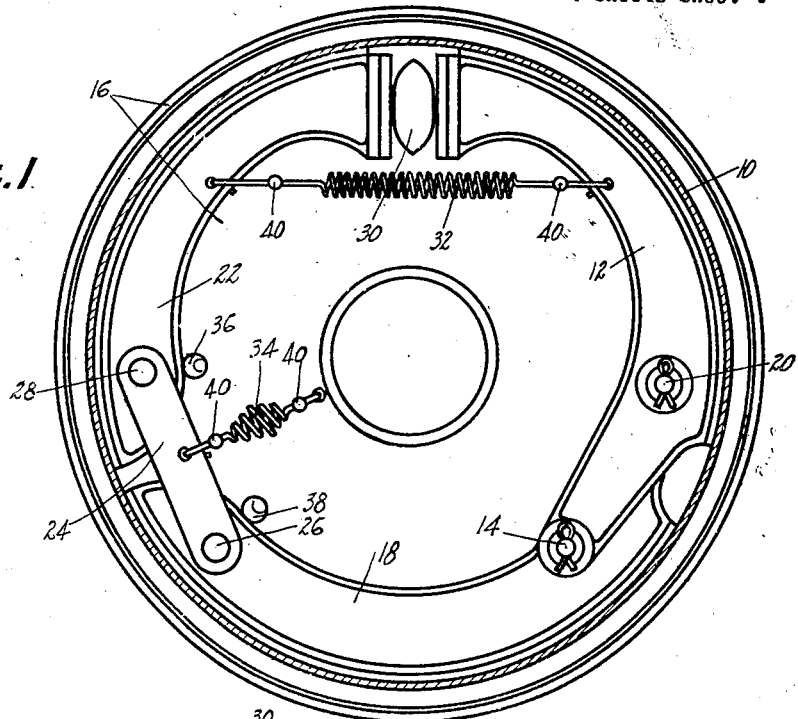
Fig. 1 is a vertical section through one brake, just inside the wheel, showing the shoes in side elevation.

The brake of Fig. 1 includes a drum 10 rotating with the wheel (not shown), and within which are arranged end to end a reverse shoe 12 anchored at 14 on a backing plate 16, a central shoe 18 anchored on the backing plate at 20, and a servo or unanchored shoe 22. Shoe 12 is forked or otherwise formed at its end to straddle or overlap the end of shoe 18, anchor 14 passing through a relatively large opening in shoe 18 and anchor 20 passing through a relatively large opening in shoe 12. This arrangement is more fully described in U. S. Patent No. 1,567,716.

Shoes 18 and 22 are connected by rigid links 24, there being preferably two of them, one on each side of the shoes, and which are pivoted to shoe 18 by a pin 26 and to shoe 22 by a pin 28. Shoes 12 and 22 are forced apart to apply the brake by means such as a double cam 30, against the resistance of a return spring 32 connected at its opposite ends to the two shoes. The connected ends of shoes 18 and 22 are urged away from the drum by means shown as a spring 34 connected at one end to backing plate 16 and at its other end to one or both links 24, and holding the shoes in positions determined by eccentric adjustable stops 36 and 38.

When the cam 30 or its equivalent is operated to apply the brake, shoe 12 is forced against the drum at once, to retard reverse movement of the car, but shoe 22, being held by spring 34 against stop 36, fulcrums about the stop so that at first only its unconnected end engages the drum, its connected end at first moving slightly away from the drum. Thereafter the shoe turns with the drum, swinging links 24 about pin 26 and partly overcoming spring 34, until the connected end of the shoe engages the drum. Finally the entire servo shoe turns with the drum, acting through links 24 and additionally overcoming spring 34, to force shoe 18 against the drum. It will be seen that this gives a gradual, smooth, progressive application of the brake.

Each of the springs 32 and 34 is upset near its ends to form spherical bulges or shoulders 40 to be engaged (Fig. 6) by a forked tool 42 which takes the tension of the spring while it is being attached or detached, thus facilitating assembly.

Figure 2:
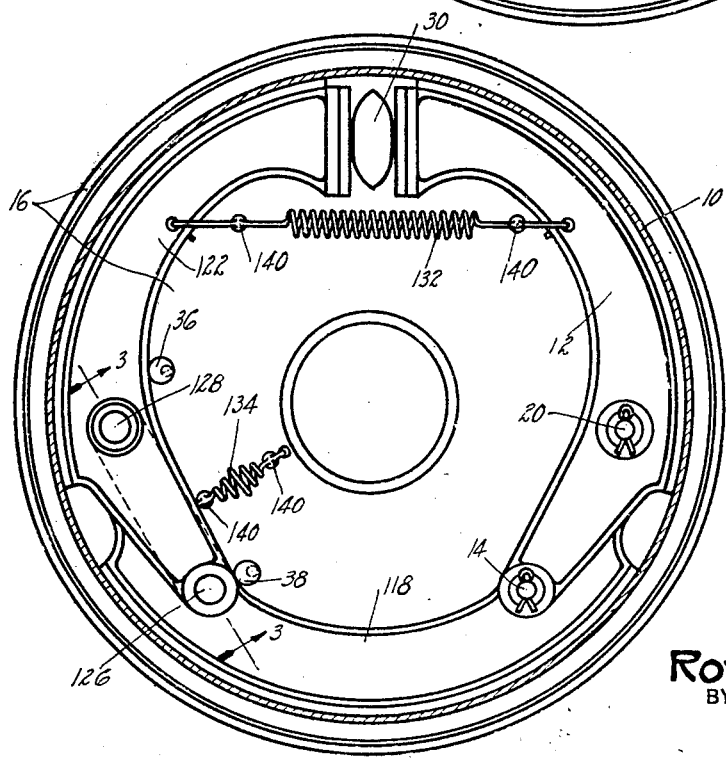
Fig. 2 is a similar section through a second brake.

The brake of Fig. 2 differs in several respects from that just described, but is of the same general organization, and operates in substantially the same way. Springs 132 and 134, corresponding to springs 32 and 34, have parts 140 near their ends flattened to spread the metal to form disk-shaped portions serving as shoulders to be engaged by tool 42 (Fig. 7).

Also servo shoe 122 is forked or otherwise formed at its ends to straddle or overlap the end of the anchored shoe 118 (Fig. 3). A single link 124, held slidably against the backing plate 16, is pivoted to the end of shoe 122 by a pin 126 passing through a relatively large opening in shoe 118, and is pivoted to the end of shoe 118 by a pin 128 passing through relatively large openings in the arms forming the forked end of shoe 122.

While two illustrative embodiments have been described in detail, it is not my intention to limit the scope of the invention to those particular embodiments, or otherwise than by the terms of the appended claims.

I claim:

1. A brake comprising, in combination, a drum, shoes engageable with the drum and one of which is pivotally anchored and a rigid floating link pivotally connected at its ends directly to the shoes, the shoes being so arranged that the unanchored shoe turns with the drum and forces the other shoe against the drum through said link.

2. A brake comprising, in combination, a drum, shoes arranged end to end and engageable with the drum and one of which is anchored, and a rigid floating link pivotally connected at its ends directly to the shoes, the shoes being so arranged that the unanchored shoe turns with the drum and forces the other against the drum through said link.

3. A brake comprising, in combination, a drum, a shoe anchored at one end within the drum, a servo shoe arranged at the unanchored end of the anchored shoe, and a rigid floating link pivoted at its ends to the adjacent ends respectively of the two shoes.

4. A brake comprising, in combination, a drum, a shoe anchored at one end within the drum, a servo shoe arranged at the unanchored end of the anchored shoe, a rigid floating link pivoted at its ends to the adjacent ends respectively of the two shoes, and means for holding the anchored shoe away from the drum until after the servo shoe engages the drum and turns with the drum to act through said link to force the anchored shoe against the drum.

5. A brake comprising, in combination, a drum, a shoe anchored at one end within the drum, a servo shoe arranged at the unanchored end of the anchored shoe, a rigid floating link pivoted at its ends to the adjacent ends respectively of the two shoes, and a spring for holding the anchored shoe away from the drum until after the servo shoe engages the drum and turns with the drum to act through said link to force the anchored shoe against the drum.

6. A brake comprising, in combination, a drum, a shoe anchored at one end within the drum, a servo shoe arranged at the unanchored end of the anchored shoe, a rigid floating link pivoted at its ends to the adjacent ends respectively of the two shoes, and a spring connected to said link and urging the anchored shoe away from the drum until after the servo shoe engages the drum and turns with the drum to act through said link to force the anchored shoe against the drum.

7. A brake comprising, in combination, a drum, a shoe anchored at one end within the drum, a servo shoe arranged at the unanchored end of the anchored shoe, a rigid floating link pivoted at its ends to the adjacent ends respectively of the two shoes, and a brake-applying device acting on the unlinked end of the servo shoe.

8. A brake comprising, in combination, a drum, a shoe anchored at one end within the drum, a servo shoe arranged at the unanchored end of the anchored shoe, a rigid floating link pivoted at its ends to the adjacent ends respectively of the two shoes, a third shoe anchored at the end next the anchored end of the first shoe and arranged with its unanchored end adjacent the unlinked end of the servo shoe, and means for forcing the adjacent ends of the servo shoe and the third shoe apart to apply the brake.

9. A brake comprising, in combination, a drum, a shoe anchored at one end within the drum, a servo shoe arranged at the unanchored end of the anchored shoe, a rigid floating link pivoted at its ends to the adjacent ends respectively of the two shoes, a third shoe anchored at the end next the anchored end of the first shoe and arranged with its unanchored end adjacent the unlinked end of the servo shoe, and a double cam between the adjacent ends of the servo shoe and the third shoe to force them apart to apply the brake.

10. A brake comprising, in combination, a drum, a shoe anchored at one end within the drum, a servo shoe arranged at the unanchored end of the anchored shoe, a rigid floating link pivoted at its ends to the adjacent ends respectively of the two shoes, a third shoe anchored at the end next the anchored end of the first shoe and arranged with its unanchored end adjacent the unlinked end of the servo shoe, means for forcing the adjacent ends of the servo shoe and the third shoe apart to apply the brake, and springs urging the servo and third shoes toward each other away from the drum and urging the unanchored end of the first shoe away from the drum.

11. A brake comprising, in combination, a drum, a shoe anchored at one end within the drum, a servo shoe arranged at the unanchored end of the anchored shoe, a rigid floating link pivoted at its ends to the adjacent ends respectively of the two shoes, a third shoe anchored at the end next the anchored end of the first shoe and arranged with its unanchored end adjacent the unlinked end of the servo shoe, means for forcing the adjacent ends of the servo shoe and the third shoe apart to apply the brake, a spring urging the servo and third shoes toward each other away from the drum, and an auxiliary spring urging the unanchored end of the first shoe away from the drum.

12. A brake comprising, in combination, a drum, a shoe anchored at one end within the drum, a servo shoe arranged at the unanchored end of the anchored shoe, a rigid floating link pivoted at its ends to the adjacent ends respectively of the two shoes, a third shoe anchored at the end next the anchored end of the first shoe and arranged with its unanchored end adjacent the unlinked end of the servo shoe, means for forcing the adjacent ends of the servo shoe and the third shoe apart to apply the brake, a spring urging the servo and third shoes toward each other away from the drum, and an auxiliary spring urging the unanchored end of the first shoe away from the drum, the auxiliary spring being connected to the link at one end.

13. A brake comprising, in combination, a drum, a pair of overlapping shoes within the drum, one of which has a forked end straddling the end of the other, and one of said overlapping shoes being pivotally anchored, a link pivotally connecting the overlapping ends of the shoes, and means for forcing one shoe against the drum to turn with the drum and act through said link to force the other shoe against the drum.

14. A brake comprising, in combination, a drum, a pair of overlapping shoes within the drum, a link pivotally connecting the overlapping ends of the shoes, a third shoe overlapping the opposite end of one of said pair of shoes, and means for forcing said third shoe and the other of said pair of shoes apart against the drum to apply the brake.

15. A brake comprising, in combination, a drum, a pair of overlapping shoes within the drum, a link pivotally connecting the overlapping ends of the shoes, a third shoe overlapping the opposite end of one of said pair of shoes, means for taking braking torque from the overlapping ends of the third shoe and said one shoe, and means for forcing said third shoe and the other of said pair of shoes apart against the drum to apply the brake.

16. A brake comprising, in combination, a drum, a pair of shoes arranged end to end within the drum, a floating link pivotally connecting the adjacent ends of said shoes, a separate stop engaging each of said adjacent ends in idle position, and a spring connected to the link and urging the shoes against said stops.

17. A brake comprising, in combination, a drum, a pair of shoes arranged end to end within the drum and one of which is anchored, a link connecting the adjacent end of the shoes, a spring urging the linked ends of said shoes away from the drum, means for forcing the unlinked end of the unanchored shoe against the drum, and a stop engaging the unanchored shoe and about which the shoe fulcrums when its unlinked end is forced outward so that the linked end at first turns inward, being held by said spring against the stop, the unlinked end then turning with the drum partly to overcome the spring and force the linked end against the drum, and the entire unanchored shoe then turning with the drum additionally to overcome the spring and act through the link to force the anchored shoe against the drum.

18. A brake comprising, in combination, a drum, a pair of shoes arranged end to end within the drum and one of which is anchored, means connecting the adjacent ends of the shoes, a spring urging the connected ends of said shoes away from the drum, means for forcing the unconnected end of the unanchored shoe against the drum, and a stop engaging the unanchored shoe and about which the shoe fulcrums when its unconnected end is forced outward so that the connected end at first turns inward, being held by said spring against the stop, the unconnected end then turning with the drum partly to overcome the spring and force the connected end against the drum, and the entire unanchored shoe then turning with the drum additionally to overcome the spring and act through said connecting means to force the anchored shoe against the drum.

19. A brake comprising, in combination, a drum, a pair of connected shoes anchored within the drum anchored at one end of one of the shoes, means for forcing the opposite end of the other shoe against the drum, a spring urging the connected ends of the shoes away from the drum, and a stop engaging the unanchored shoe some distance from its connected end and against which the shoe is held by said spring.

20. A brake comprising, in combination, a drum, a friction device engageable with the drum, and a spring urging said device away from the drum and formed with a sharp shoulder for engagement by a tool taking the tension of the spring while it is being attached or detached.

21. A brake comprising, in combination, a drum, a friction device engageable with the drum, and a spring urging said device away from the drum and upset to form an integral projection for engagement by a tool taking the tension of the spring while it is being attached or detached.

In testimony whereof, I have hereunto signed my name.

ROY S. SANFORD.